(12) United States Patent
Brott et al.

(10) Patent No.: US 8,059,217 B2
(45) Date of Patent: Nov. 15, 2011

(54) STEREOSCOPIC 3D LIQUID CRYSTAL DISPLAY APPARATUS WITH SLATTED LIGHT GUIDE (75) Inventors: Robert L. Brott, Woodbury, MN (US); William J. Bryan, Mahtomedi, MN (US); David J. Lundin, Woodbury, MN (US); Michael A. Meis, Stillwater, MN (US); John C. Schultz, Afton, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 13/026,386

(22) Filed: Feb. 14, 2011

(65) Prior Publication Data
US 2011/0134347 A1 Jun. 9, 2011

Related U.S. Application Data (62) Division of application No. 11/865,841, filed on Oct. 2, 2007, now Pat. No. 7,911,547.

(60) Provisional application No. 60/828,399, filed on Oct. 6, 2006.

(51) Int. Cl.
*G02F 1/1335* (2006.01)
*G01C 3/14* (2006.01)

(52) U.S. Cl. .............. 349/15; 356/12; 349/61; 349/62; 349/65

(58) Field of Classification Search ............. 349/61, 349/62, 65, 15; 362/26–27, 29–30, 225, 362/600, 602, 611–612, 615–616; 356/12
See application file for complete search history.

(56) References Cited

U.S. PATENT DOCUMENTS

| | | | |
|---|---|---|---|
| 7,086,771 B2 * | 8/2006 | Kawabata et al. | 362/600 |
| 7,226,197 B2 * | 6/2007 | Hayashi et al. | 362/608 |
| 2006/0125774 A1 * | 6/2006 | Nishigaki | 345/102 |

* cited by examiner

*Primary Examiner* — Hoan Nguyen (57) ABSTRACT

A scanning backlight for a stereoscopic 3D liquid crystal display apparatus includes a light guide formed from a plurality of segments. Each segment has a first side and a second side opposite the first side, and a first surface extending between the first and second sides and a second surface opposite the first surface. The first surface substantially re-directs light and the second surface substantially transmits light. The plurality of segments are arranged substantially in parallel and with the second surfaces transmitting light in substantially the same direction to provide backlighting for a stereoscopic 3D liquid crystal display. A first light source is disposed along the first side of each segment for transmitting light into the light guide from the first side, and a second light source is disposed along the second side of each segment for transmitting light into the light guide from the second side. Each segment first and second light source is selectively turned on and off in a particular pattern and each segment light source selectively transmits light into the light guide first side or light guide second side to form a scanning backlight.

5 Claims, 3 Drawing Sheets

STEREOSCOPIC 3D LIQUID CRYSTAL DISPLAY APPARATUS WITH SLATTED LIGHT GUIDE

CROSS-REFERENCE TO RELATED APPLICATION

This application is a divisional of U.S. Ser. No. 11/865,841, filed Oct. 2, 2007, now U.S. Pat. No. 7,911,547 now allowed, which claims the benefit of U.S. Provisional Application Ser. No. 60/828,399 filed Oct. 6, 2006.

FIELD

The present disclosure relates to a backlit liquid crystal display apparatus and particularly to displaying stereo 3D images using liquid crystal display apparatus having a slatted light guide.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Turning on the light source to light the first or right image at time t=0 provides light to the right image. At time t=16.67 ms (typical 60 Hz refresh rate) the second or left image starts to be put in place. The second image replaces the first image and can take 16.67 ms to complete the transformation. Current systems turn off all the light sources that illuminate the first or right image and then turn on all the light sources that illuminate the second or left image at sometime during the second image transformation. This can lead to "cross-talk" or "ghosting" of the first or right image in the second or left image, degrading the stereoscopic 3D effect.

BRIEF SUMMARY

The present disclosure relates to a backlit liquid crystal display apparatus and particularly to displaying stereo 3D images using liquid crystal display apparatus having a slatted light guide.

In a first embodiment, a scanning backlight for a stereoscopic 3D liquid crystal display apparatus includes a light guide formed from a plurality of segments. Each segment having a first side and a second side opposite the first side, and having a first surface extending between the first and second sides and a second surface opposite the first surface. The first surface substantially re-directs light and the second surface substantially transmits light. The plurality of segments are arranged substantially in parallel and with the second surfaces transmitting light in substantially the same direction to provide backlighting for a stereoscopic 3D liquid crystal display. A first light source is disposed along the first side of each segment for transmitting light into the light guide from the first side, and a second light source is disposed along the second side of each segment for transmitting light into the light guide from the second side. Each segment first and second light source is selectively turned on and off in a particular pattern and each segment light source selectively transmits light into the light guide first side or light guide second side to form a scanning backlight.

In another embodiment, a stereoscopic 3D liquid crystal display apparatus includes a liquid crystal display panel, drive electronics configured to drive the liquid crystal display panel with alternating left eye and right eye images, and a scanning backlight positioned to provide light to the liquid crystal display panel. The scanning backlight includes a light guide formed from a plurality of segments. Each segment having a first side and a second side opposite the first side, and having a first surface extending between the first and second sides and a second surface opposite the first surface. The first surface substantially re-directs light and the second surface substantially transmits light, and the plurality of segments are arranged substantially in parallel and with the second surfaces transmitting light in substantially the same direction to provide backlighting for the stereoscopic 3D liquid crystal display panel. A first source is disposed along the first side of each segment for transmitting light into the light guide from the first side, and a second light source is disposed along the second side of each segment for transmitting light into the light guide from the second side. Each segment first and second light source is selectively turned on and off in a particular pattern and each segment light source selectively transmits light into the light guide first side or light guide second side to form a scanning backlight.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of a special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a backlit liquid crystal display apparatus and particularly to displaying stereo 3D images using liquid crystal display apparatus having a slatted light guide. This apparatus can provide a spatially controlled, variable intensity light source formed from horizontally arranged zones of light that can reduce cross talk or "ghosting". Ghosting is created when all or a portion of the LCD panel has not been completely erased of the previous image and the directional backlight is switched. For example, if the left image is displayed with the left image light source, ghosting will occur if the right image light source is turned on before the display is either made black or the right image becomes stable on the display.

In many embodiments, these slatted (i.e., segmented) scanning backlights utilize light emitting diodes to illuminate the edge of a thin, narrow zone (e.g., segment) of a solid or hollow light guide and time sequencing each horizontal zone and/or each right/left end of a slat (e.g., segment or zone). These thin, narrow zones, segments, or slats of the light guide have a light emitting surface length and width that can be sized relative to the LCD panel response time so that the entire backlight is completely lit within one display refresh. One or more segments (i.e., slats) are sequentially lit in synchronization with the display.

One or more of these embodiments may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

Figure 1:
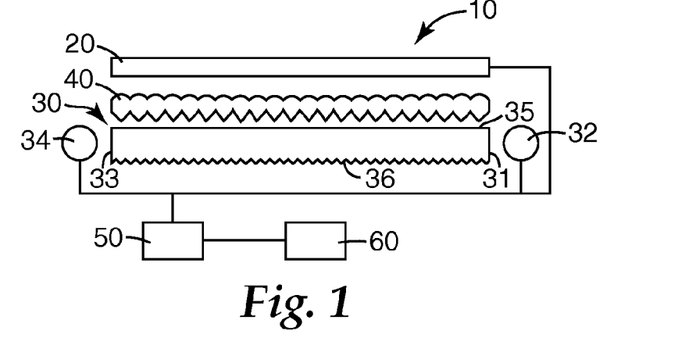
FIG. 1 is a schematic side view of an illustrative display apparatus.

FIG. 1 is a schematic side view of an illustrative display apparatus 10. The display apparatus includes a liquid crystal display panel 20 and a scanning backlight 30 positioned to provide light to the liquid crystal display panel 20. The scanning backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the scanning backlight 30.

The liquid crystal display panel 20 and/or scanning backlight 30 can have any useful shape or configuration. In many embodiments, the liquid crystal display panel 20 and scanning backlight 30 has a square or rectangular shape. However, in some embodiments, the liquid crystal display panel 20 and/or scanning backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the scanning backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The scanning backlight 30 can be any useful scanning backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated scanning backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33, and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The scanning backlight can be a single layer of optically clear material with light sources at both ends or two (or more) layers of optically clear material with a light source per layer which preferentially extract light in a desired direction for each layer.

The double sided prism film 40 can be any useful prism film having a lenticular structure on a first side and a prismatic structure on an opposing side. The double sided prism film 40 transmits light from the scanning backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
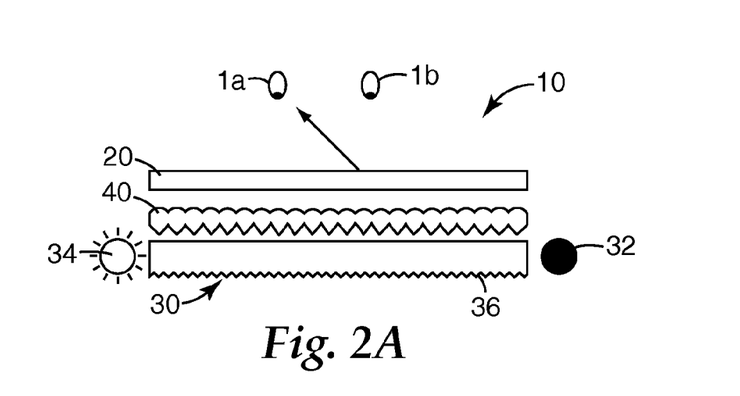
FIG. 2A and FIG. 2B are schematic side views of an illustrative display apparatus in operation.
Figure 2B:
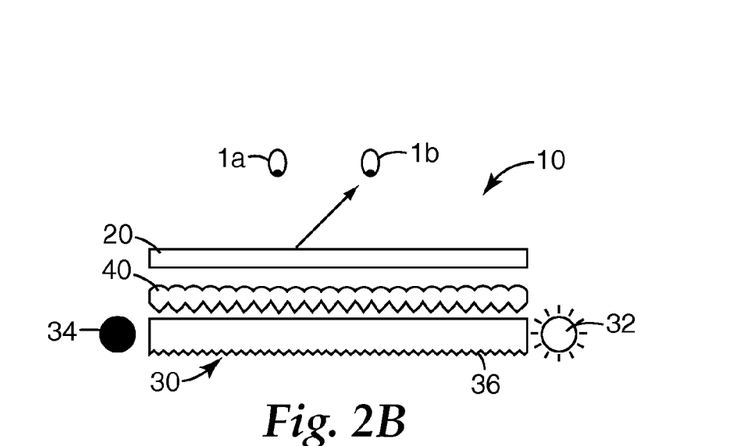

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the scanning backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the scanning backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can beair coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every $\frac{1}{60}$ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition, typically resulting in a display with low brightness because the image data must be stable or reasonably so over the entire image if the sequential left and right images are not to be illuminated with the incorrect light source which will lead to 3D cross talk and a poor 3D viewing experience.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

The segmented or slatted scanning backlight 30 and associated light sources 32, 34 described herein can be very thin (thickness or diameter) such as, for example, less then 5 millimeters, or from 0.25 to 5 millimeters, or from 0.5 to 4 millimeters, or from 0.5 to 2 millimeters.

Figure 3:
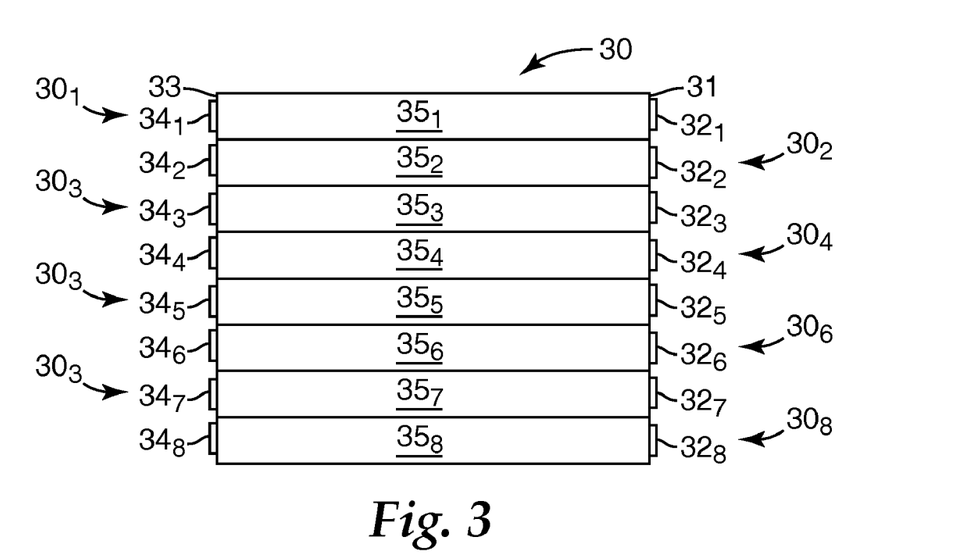
FIG. 3 is a schematic diagram front view of an illustrative scanning backlight for displaying alternating right and left images.

FIG. 3 is a schematic diagram front view of an illustrative scanning backlight 30 for displaying alternating right and left images. The scanning backlight 30 is formed from a plurality of segments (i.e., slats) $30_1$, $30_2$, $30_3$, $30_4$, $30_5$, $30_6$, $30_7$, $30_8$ where each segment includes a first side 31 or first light input surface 31 adjacent to the plurality of first light sources $32_1$, $32_2$, $32_3$, $32_4$, $32_5$, $32_6$, $32_7$, $32_8$ or right eye image solid state light source, and an opposing second side 33 or second light input surface 33 adjacent to the plurality of second light sources $34_1$, $34_2$, $34_3$, $34_4$, $34_5$, $34_6$, $34_7$, $34_8$ or left eye image solid state light source. A first surface 36 (shown in FIG. 1) extends between the first side 31 and second side 33 and a second surface $35_1$, $35_2$, $35_3$, $35_4$, $35_5$, $35_6$, $35_7$, $35_8$, opposite the first surface 36, extends between the first side 31 and second side 33. The first surface substantially re-directs (e.g., reflects, extracts, and the like) light and the second surface $35_1$, $35_2$, $35_3$, $35_4$, $35_5$, $35_6$, $35_7$, $35_8$ substantially transmits light to the double sided prism film and LCD panel, as described in FIG. 1.

The backlight can be formed by placing each segment next to each other and adhering the segments together or fixed in a parallel manner with all the second surfaces transmitting light in substantially the same direction to provide backlighting for the stereoscopic 3D liquid crystal display.

Thus, each segment includes a first light source transmitting light into a segment first side, a second light source transmitting light into a segment second side, a light transmission surface and an opposing light re-directing surface extending between the segment first side and segment second side. The plurality of segments are arranged substantially in parallel and with the first surfaces transmitting light in substantially the same direction to provide backlighting for a stereoscopic 3D liquid crystal display. These segments are selectively lit from one side of each segment and illuminating each segment sequentially down the display. In many embodiments, the video or data signals drive the LCD panel in synchronization with the sequential lighting of the segments down the display.

The illustrated embodiment includes eight segments. More or less than eight segments are possible and may be preferred to increase the ON time for any particular segment or group of segments as a fraction of the image display time; however, the example of eight segments illustrates the general concept. In other embodiments, the backlight includes any useful number of segments such as, for example, four, five, six, seven, eight, nine, or ten segments or more, as desired.

In many embodiments, the scanning backlight 30 segments are lit (by one side) sequentially from the top of the display to the bottom of the display for a first image from (e.g., a right eye view image) and then the scanning backlight 30 segments are lit (by the other side) sequentially from the top of the display to the bottom of the display for a second image from (e.g., a left eye view image). A rolling segment can be unlit from either the first or second side 31, 33 to separate the right eye view image from the left eye view image. For example, segments $30_1$, $30_2$ and $30_3$ can be lit from the second light sources $34_1$, $34_2$ and $34_3$ and lighting a left eye view image on the LCD panel 20, segments $30_5$, $30_6$, $30_7$ and $30_8$ can be lit from the first light sources $32_5$, $32_6$, $32_7$ and $32_8$ and lighting a right eye view image on the LCD panel 20, and segment $30_4$ can be unlit from either light source $32_4$, $34_4$. More than one segment or slat (e.g., two or three segments or slats) can be unlit between the new data and old data lines (e.g., first image frame and second image frame).

Figure 7:
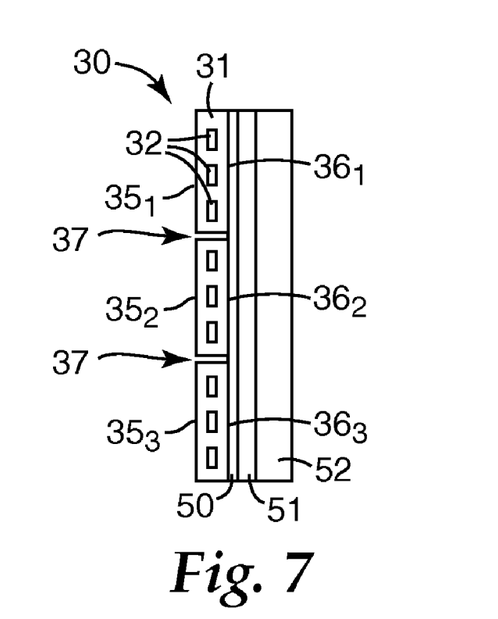
FIG. 7 is another schematic side view of an illustrative scanning backlight for displaying alternating right and left images.
Figure 8:
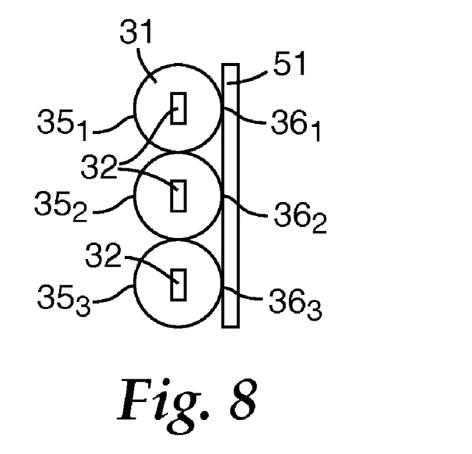
FIG. 8 is a further schematic side view of an illustrative scanning backlight for displaying alternating right and left images.

Various mechanical support methods may be used to maintain the parallel alignment of the segments. A backing film, possibly with light extraction features and a highly reflective surface can be laminated to the segments as shown in FIG. 7 and FIG. 8. The backing material of thin metal can be used as both a structural support for this film layer if needed and as a thermal spreading and/or dispersion layer for the light sources. In some embodiments, the segments or slats have film layers on both the first surface 36 and the second surface 35.

Figure 4:
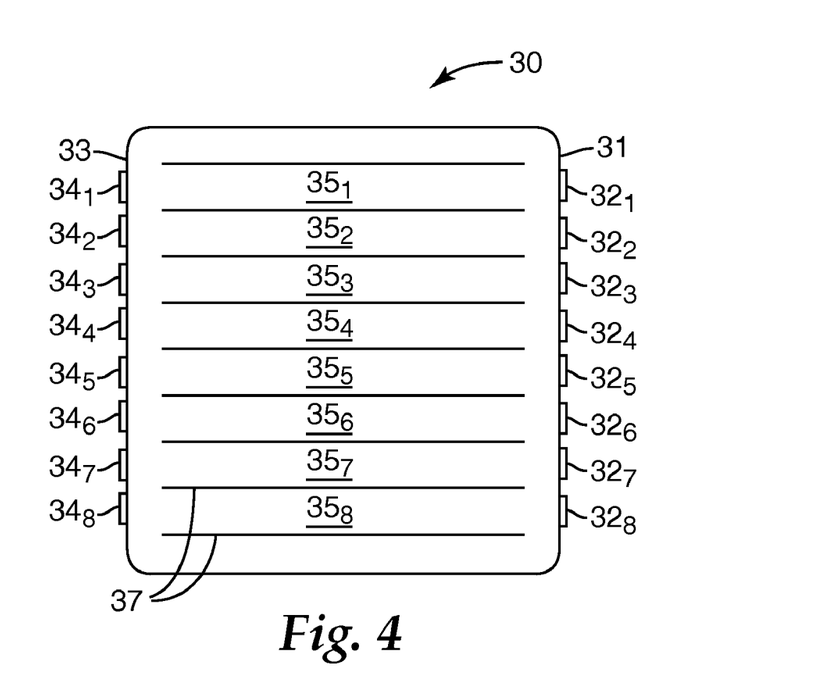
FIG. 4 is another schematic diagram front view of an illustrative scanning backlight for displaying alternating right and left images.

FIG. 4 is another schematic diagram front view of an illustrative scanning backlight for displaying alternating right and left images. This scanning backlight 30 is similar to the scanning backlight described in FIG. 3, however, this scanning backlight 30 is formed by cutting or otherwise making gaps 37 in a monolithic light guide to separate at least a portion of each segment or slat thickness from an adjacent segment or slat. These gaps 37 can be air gaps that at least partially optically separate adjacent segments from each other. These gaps 37 can be optical gaps that, for example, can be physical gaps filled with a material with a different index of refraction and/or absorption or scattering as compared to the bulk material of the light guide. As illustrated, the segments remained joined at the edges of the light guide to stiffen and support the segments structures.

Figure 5:
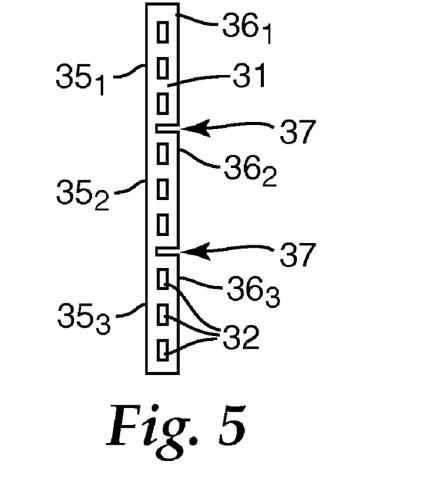
FIG. 5 is a schematic side view of an illustrative scanning backlight for displaying alternating right and left images.
Figure 6:
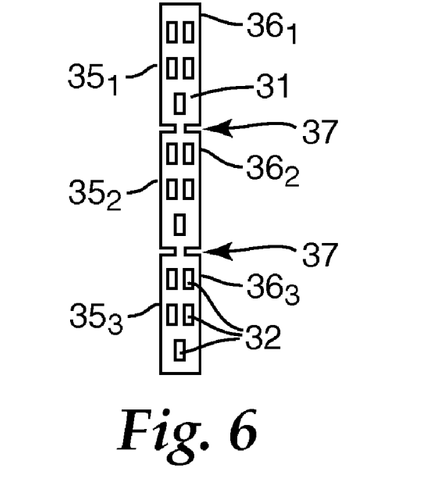
FIG. 6 is another schematic side view of an illustrative scanning backlight for displaying alternating right and left images.

FIGS. 5 to 8 are schematic side views of illustrative scanning backlights for displaying alternating right and left images. FIGS. 5 to 7 illustrate three segments that have a rectangular cross-sectional shape and includes a first substantially planar surface $36_1$, $36_2$, and $36_3$, and an opposing second substantially planar surface $35_1$, $35_2$, and $35_3$. FIG. 8 illustrates three segments that have a circular cross-sectional shape and includes a first curved surface $36_1$, $36_2$, and $36_3$, and an opposing second curved surface $35_1$, $35_2$, and $35_3$.

The FIG. 8 segments are elongated light rods. These elongated light rods have light extraction structures that direct out of the light transmission surface $35_1$, $35_2$, $35_3$. Elongated light rods with extraction structures are described in U.S. Pat. Nos. 5,432,876; 5,845,038; and 6,367,941.

With the advent of small, high brightness light sources such as LEDs, these light rods can be used for backlighting the LCD panels. One advantage of these light sources, particularly LEDs, solid state lasers and OLEDs is the improved color gamut if red/green/blue and possibly additional colors such as white, cyan, magenta and yellow are used as the illumination source. Having an array of spaced LEDs supplying the light to the LCD panel has proven to provide sufficient illumination levels.

The light rod mimics the linear nature of fluorescent lamps by using solid state light sources with the linear light rod light guides. Commercially available LED packages, if bright enough, can simply be coupled into the linear light rods. For improved light injection, one may use a tapered light rod at the injection point to capture the wide angle light and change the angles (to allow total internal reflection (TIR) into and down the light rod. If additional light from each light rod is needed or if one desires to incorporate red/green/blue as well as additional colors, for example, white, cyan, magenta and yellow, into the end of the light rod, one can use the features disclosed in U.S. Pat. No. 6,618,530, incorporated herein by reference, for combining light sources into a single light guide end. Another way to increase the amount of light is to combine several LED die, possibly coated with phosphor(s) emitting at different and/or broader wavelengths in close proximity to each other so that the overall light injected is cumulative. If allowed to space out the LED light sources along the length of the light guide rod, one could provide additional light to the linear light guide by periodically adding an LED injection site with the incorporation of a diverter into the side of the linear light rod.

One version of an elongated or linear light rod is the HL (high luminance) Light Fiber product (3M Company). It's construction is one of core and cladding. The core is an extremely clear acrylate surrounded by a fluropolymer cladding. Additionally, the cladding is highly filled with $TiO_2$ for enhanced extraction of light. Although it has the right form factor, the extraction is around the whole diameter so additional materials may be needed to reflect light that is not aimed at the LCD panel. Another linear light guide could be the use of a clear PMMA rod. It is common to modify the rod shaped light guide with a stripe of white paint or other white material to extract light more aggressively in a preferred direction. One could vary the extraction rate down the length of the guide by changing the modification to the strip of material. Similarly, one could machine the stripe surface with extraction structures to accomplish the light extraction. If those extraction structure were engineered, optically smooth surfaces and close control of the extracted light are possible. This method is disclosed in the following US patents, all of which are incorporated herein by reference: U.S. Pat. Nos. 5,432,876; 5,845,038; and 6,367,941.

A tapered light guide for enhanced injection incorporates the angle provided by the taper and uses it to change the angle of the exiting light. The use of a harness coupler for having multiple LED injection into a given light guide is another method of transmitting multiple LED light into a linear light guide. The ability to pack many LED die into a tight package is disclosed in US Patent Application No. 2005/0140270, incorporated herein by reference. This method allows for increased brightness by the addition of many die within the cross sectional area of the rod shaped light guide. If the linear rod needs more light than what can be provided into the ends, light can be injected periodically along the length by using a type of diverter.

With the Light Fiber product (3M Company) one can get the linear rod form factor, but it may not be able to efficiently deliver light in a controlled fashion to a specific target. Additional films or coatings may be required to redirect light that is not directed to the LCD panel. Another way to create a linear light guide is to modify an acrylic rod. By roughening the surface or adding a white stripe of material down the length, one can extract light from the guide. Other ways include the use of a rectangular, light guide that employs optically smooth notches. This use for extracting light provides more efficient light extraction to the target and is disclosed in U.S. Pat. No. 5,894,539, incorporated herein by reference. For improved angular control, while still using TIR for extracting, one can use techniques disclosed in U.S. Pat. No. 5,845,038, incorporated herein by reference. By adding additional rows of notches, one can provide a wider cone of light, which helps provide uniform illumination to the back of the LCD panel. As shown in FIG. 8, the LED light rods can be used to form a scanning backlight assembly, which is controlled by an electronic system to deliver the scanning operation. The backlight includes several spaced light rods illuminated in sequence to provide the scanning function.

For all the disclosed embodiments, each segment is lit with one or more light sources 32 (e.g., LEDs) in any useful configuration. FIG. 5 and FIG. 7 illustrate a single row of three LEDs 32 lighting each segment. FIG. 6 illustrates two rows of LEDs 32, 5 total, lighting each segment. FIG. 8 illustrates a single LED 32 lighting each segment. In one embodiment, each segment is lit with white LEDs. In another embodiment, each segment is lit with white and red LEDs. In another embodiment, each segment is lit with a group of monochromatic LEDs (e.g., green-red-green-blue). Alternatively, the LEDs can be sequenced in color such that colors are sequenced down the display, enabling a field sequential color solution to display color imagery without requiring color filters in the LCD panel.

FIG. 5 illustrates segments that are partially separated by an air gap 37 and partially joined to each other at the second surface $35_1$, $35_2$, $35_3$. However, it is understood that the segments can be alternatively joined at the first surface $36_1$, $36_2$, $36_3$, not shown.

FIG. 6 illustrates segments that are partially separated by an air gap 37 at both the second surface $35_1$, $35_2$, $35_3$ and the first surface $36_1$, $36_2$, $36_3$, and partially joined to each other between the second surface $35_1$, $35_2$, $35_3$ and the first surface $36_1$, $36_2$, $36_3$.

In embodiments where the segments are partially joined to an adjacent segment, the joining thickness can be any useful percentage of the total thickness of the segments. In many embodiments, the joining thickness is a value in a range from 1 to 90% or from 1 to 50% or from 1 to 25%.

FIG. 7 illustrates segments that are completely separated from one another by an air gap 37. The three illustrated segments are adhered to a reflective film 51 via an adhesive layer 50, and a thermal sink layer 52 contacts the reflective film 51. The reflective film 51 assists in providing mechanical support to maintain alignment of the parallel segments, as described above.

Thus, embodiments of the STEREOSCOPIC 3D LIQUID CRYSTAL DISPLAY APPARATUS WITH SLATTED LIGHT GUIDE are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A scanning backlight for a stereoscopic 3D liquid crystal display apparatus, comprising:
    a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel, with the second surfaces transmitting light in substantially the same direction to provide backlighting for a stereoscopic 3D liquid crystal display;
    a first light source is disposed along the first side of each segment for transmitting light into the light guide from the first side; and
    a second light source is disposed along the second side of each segment for transmitting light into the light guide from the second side;
    wherein, only one of each segment first or second light source is selectively turned on and off in a particular pattern and each segment first or second light source selectively transmits light into only one of the light guide first side or light guide second side to form a scanning backlight, and
    wherein each segment is partially separated from an adjacent segment by an air gap and the each segment is joined with an adjacent segment at the first surface, or second surface, or between the first surface and second surface.

2. A scanning backlight for a stereoscopic 3D liquid crystal display apparatus, comprising:
    a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel, with the second surfaces transmitting light in substantially the same direction to provide backlighting for a stereoscopic 3D liquid crystal display;
    a first light source is disposed along the first side of each segment for transmitting light into the light guide from the first side; and
    a second light source is disposed along the second side of each segment for transmitting light into the light guide from the second side;
    wherein, only one of each segment first or second light source is selectively turned on and off in a particular pattern and each segment first or second light source selectively transmits light into only one of the light guide first side or light guide second side to form a scanning backlight, and
    wherein each segment is completely separated from an adjacent segment.

3. A scanning backlight for a stereoscopic 3D liquid crystal display apparatus, comprising:
    a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel, with the second surfaces transmitting light in substantially the same direction to provide backlighting for a stereoscopic 3D liquid crystal display;
    a first light source is disposed along the first side of each segment for transmitting light into the light guide from the first side; and
    a second light source is disposed along the second side of each segment for transmitting light into the light guide from the second side;
    wherein, only one of each segment first or second light source is selectively turned on and off in a particular pattern and each segment first or second light source selectively transmits light into only one of the light guide first side or light guide second side to form a scanning backlight, and
    wherein the plurality of segments comprise elongated rods.

4. A stereoscopic 3D liquid crystal display apparatus, comprising:
    a liquid crystal display panel;
    drive electronics configured to drive the liquid crystal display panel with alternating left eye and right eye images; and
    a scanning backlight positioned to provide light to the liquid crystal display panel, the scanning backlight comprising:
        a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel and with the second surfaces transmitting light in substantially the same direction to provide backlighting for the stereoscopic 3D liquid crystal display panel;
        a first light source is disposed along the first side of each segment for transmitting light into the light guide from the first side; and
        a second light source is disposed along the second side of each segment for transmitting light into the light guide from the second side;
        wherein, only one of each segment first or second light source is selectively turned on and off in a particular pattern and each segment first or second light source selectively transmits light into only one of the light guide first side or light guide second side to form a scanning backlight, and wherein each segment is partially separated from an adjacent segment by an air gap and the each segment is joined with an adjacent segment at the first surface, or second surface, or between the first surface and second surface.

5. A stereoscopic 3D liquid crystal display apparatus, comprising:
- a liquid crystal display panel;
- drive electronics configured to drive the liquid crystal display panel with alternating left eye and right eye images; and
- a scanning backlight positioned to provide light to the liquid crystal display panel, the scanning backlight comprising:
  - a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel and with the second surfaces transmitting light in substantially the same direction to provide backlighting for the stereoscopic 3D liquid crystal display panel;
  - a first light source is disposed along the first side of each segment for transmitting light into the light guide from the first side; and
  - a second light source is disposed along the second side of each segment for transmitting light into the light guide from the second side;

wherein, only one of each segment first or second light source is selectively turned on and off in a particular pattern and each segment first or second light source selectively transmits light into only one of the light guide first side or light guide second side to form a scanning backlight, and wherein the plurality of segments comprise elongated rods.

* * * * *